Sept. 22, 1925.
S. RUBEN
1,554,296
APPARATUS AND METHOD FOR PROMOTING REACTIONS BETWEEN GASES AND LIQUIDS
Filed Nov. 21, 1923
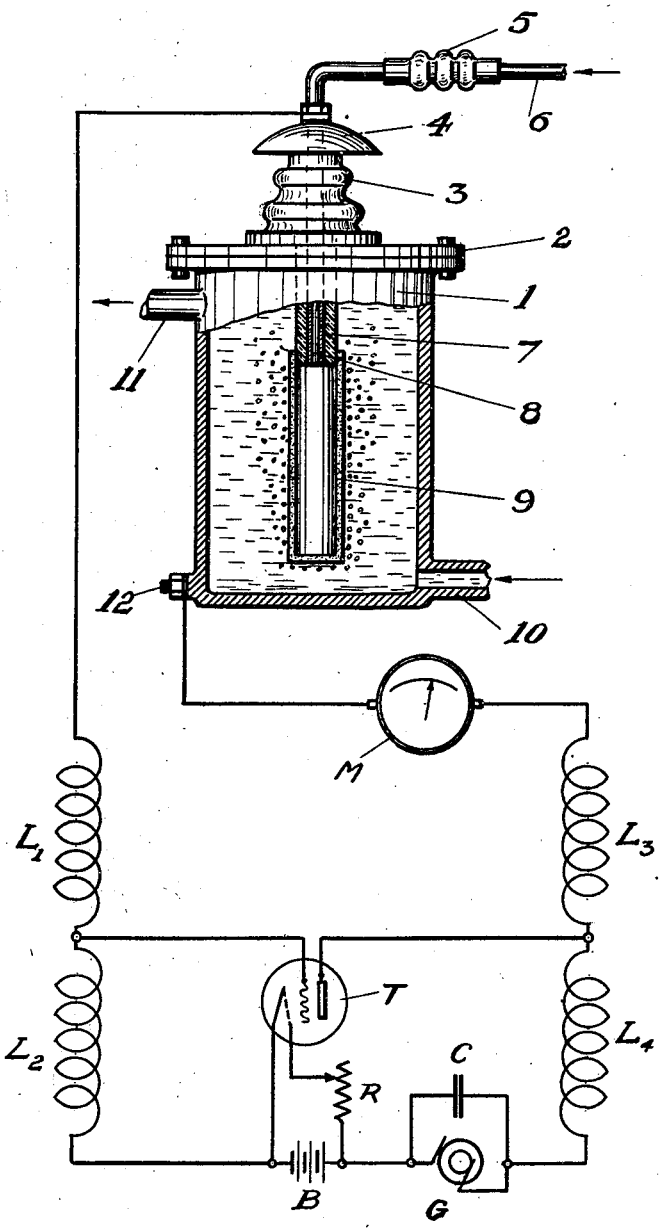
INVENTOR.
Samuel Ruben
BY M. W. Clephane
ATTORNEYS.

Patented Sept. 22, 1925.

1,554,296

UNITED STATES PATENT OFFICE.

SAMUEL RUBEN, OF NEW YORK, N. Y.

APPARATUS AND METHOD FOR PROMOTING REACTIONS BETWEEN GASES AND LIQUIDS.

Application filed November 21, 1923. Serial No. 676,202.

*To all whom it may concern:*

Be it known that I, SAMUEL RUBEN, citizen of the United States, and resident of New York city, in the county of New York and State of New York, have invented certain new and useful Apparatus and Methods for Promoting Reactions Between Gases and Liquids, of which the following is a specification.

This invention relates to an apparatus and method for combining gases and vapors with liquids; it relates more particularly to an apparatus and method for promoting chemical reactions between dielectric liquids and gases and vapors by electrostatic forces.

Its object is to provide a simple and efficient means for effecting combinations of gases and vapors with liquids without the employment of catalytic agents.

In the prior art it is the practice in effecting such reactions, commonly known as catalytic, to employ catalytic agents and temperatures. In practically all of the catalytic reactions one or both of the reacting elements is dielectric. This process is widely used in the industries, as, for instance, in the hydrogenation of oils, such as cottonseed oil, oleic acid, and other oils containing unsaturated glycerides and fatty acids, in which the agent generally employed is a finely ground metal, which has to be frequently revived or cleaned, to remove impurities, the presence of which on the surface limits the influence of the agent. The application of heat is required for efficient reactions which, in some instances, imposes practical limitations upon the reactions.

I have found that all catalytic reactions are fundamentally electrical; that is, that these reactions are wholly due to the stimulation of the electrical field of the catalytic agent by the application of sufficient energy which, in the prior art, is heat, and that the density of the electrical field and hence, the radial activity of the catalytic agent, is dependent upon the area of the exposed surface and the heat energy applied. The field of the electronic system of this activating agent electrically charges the dielectric element or elements, with a resultant electrochemical reaction between those elements in contact.

I have effected many so called catalytic reactions by impressing intense electrostatic forces upon the elements to be combined, without the presence of any activating element other than the electrostatic force.

My invention consists broadly of a process and an apparatus for impressing electrostatic forces upon gases and vapors and diffusing them while so charged, through a body of dielectric liquid, and thereby effecting a combination therebetween. In a convenient arrangement for practicing the process of the invention the gas is discharged outwardly through the walls of a porous cup, having a conductive inner surface connected to a source of high frequency and potential current, and diffusing the gas through the liquid in a container in which the cup is suspended. As the gas leaves the conductive surface, it is charged under the maximum electrostatic force and, because its dielectric capacity is lower than that of the liquid, an immediate reaction results between the gas and the material of higher dielectric capacity which is in contact with the metal walls of the container, connected as a cooperating electrode, to the source of high frequency and potential current. To obtain maximum electrochemical reactions, a current of undamped high potential oscillations must be applied to the electrical field, preferably employing therefor a vacuum tube generator of suitable capacity.

In order to afford a full understanding of the underlying principles of the invention, a specific embodiment thereof, applicable with especial advantage to the hydrogenation of hydrocarbon derivatives, such as oils of the character hereinabove mentioned, will now be described for the sake of a concrete example. The novel apparatus here selected for the purpose of explaining and illustrating the broad principles of the invention in typical form is shown in the accompanying drawing, partly in section and partly in elevation, connected in an electrical circuit.

Referring more particularly to the drawing;

At 1 is represented a metal walled container having respectively at 10 and 11, an inlet and an outlet for the liquid to be treated therein by the electrostatically charged gas, conventionally shown, entering porous cup 9 by pipe 6—8. The porous cup 9, has an electrically conductive inner coating connected as an electrode in a high frequency, high potential current circuit, the other electrode being the metal wall of the container. The porous cup is suitably insulated by 7, from pipe 8. Suitable insulators are placed at 3, 4 and 5, and one terminal of the circuit is connected to pipe 6, the other at 12.

The electrical circuit diagram represents the usual circuit arrangement and elements for the generation and discharge of undamped high potential oscillations.

In this diagram, T is the vacuum tube used as a generator of oscillations; R is a variable resistance for controlling the power output of the oscillation circuit through control of electron emission from the filament in the vacuum tube; B is the filament-heating supply source, such as a battery; G is a high voltage direct current generator, supplying 2500 volts, for example; C is a filter capacity across the generator to increase the steadiness of the oscillations and protect the generator from high frequency effects; $L_4$ is the plate circuit inductance; $L_2$ is the grid circuit inductance which is electromagnetically and electrostatically coupled to $L_4$; this arrangement allowing the maintenance of operation of the plate current circuit. Inductances $L_1$ and $L_3$ which are secondaries to the cooperating primary inductances $L_2$ and $L_4$, respectively, are of such value as to be in resonance with said primary inductances, especially $L_4$ because, $L_4$ being in the plate circuit inductance, has the maximum energy expenditure in it. In operation, because of the reaction circuit being maintained by the electrical relation of the grid to the filament circuit, the plate circuit is oscillatory and a potential is induced in the secondary $L_3$, and also in $L_1$ because of the grid current expended in $L_2$. Inductances $L_3$ and $L_1$ are so connected as to be additive, and are connected across the output terminals one of which is connected to the high frequency meter M, and the other of which is connected to the reaction chamber input electrode 4, upon which a resonance potential is accordingly impressed. As the reactor chamber containing the oil or other dielectric liquid and the gas which is to react therewith forms a capacity circuit, there will be a discharge of the resonance potential high frequency current through the circuit, the value of which current will be indicated by the meter. The maximum electrochemical, or better electrophysical, work will be effected when the indication of the meter is a maximum value, that is, when the potential from $L_1$ and $L_3$ is at a maximum. The higher the frequencies or shorter the wave lengths, the greater the electrochemical (or electrophysical) reaction, probably because of the dielectric contact effect, this depending upon the dielectric loss which increases with frequency.

When no gas is passing through the walls of the cup 9, with its conductive lining, suspended in the oil bath, and undamped oscillations of a high frequency and potential current are applied, a capacity current of high density discharges between the conductive lining of cup 9, and the other electrode, the walls of the container 1. This form of energy is used because continuous high frequency oscillations of constant amplitude are obtained, giving maximum electrostatic stress. The flow of current through this capacity circuit, with its electrical constants fixed, is primarily dependent upon the dielectric constant of the liquid. As the high frequency current discharges through the capacity circuit, which includes the inner conductive surface of the cup, and the metal walls of the container, as electrodes, the potential is distributed through the electrostatic field according to the dielectric constants of the materials in the field. So that, when the gas is discharged through the walls of the cup, because its dielectric constant is lower than that of the hydrocarbon, which it displaces, the maximum stress is impressed upon it, especially at the area of contact of the two dielectrics. It is this resultant effect which causes the combination of the gas and the hydrocarbon. The product being lighter than the uncombined hydrocarbon, rises to the top of the solution and is there drawn off through pipe 11. If the product tends to harden heat can be applied to maintain it in a fluid state.

What I claim is:

1. The method of promoting a reaction between a gaseous fluid and a liquid having a higher dielectric constant than that of said gaseous fluid, which comprises maintaining an electrical field through said dielectric liquid and discharging said gaseous fluid into close contact with said liquid within said field.

2. The method of promoting a reaction between a gaseous fluid and a dielectric liquid which comprises maintaining an electrical field through said liquid and changing the dielectric capacity current discharging through said field by discharging said gaseous fluid into close contact with said liquid within said field, substantially as described.

3. The method of promoting a reaction between a gaseous fluid and a dielectric liquid which comprises discharging undamped oscillations of high frequency current through said liquid and discharging said gaseous fluid in the field of said current into close contact with said liquid.

4. The method of promoting a reaction between a gaseous fluid and a dielectric liquid which comprises discharging undamped oscillations of a high frequency current through said liquid and discharging said gaseous fluid within said field of said current through a porous partition in close contact with said liquid.

5. In an apparatus for the purpose described, a vessel containing a gaseous fluid, an electrode in contact with said fluid, a dielectric liquid in contact with a cooperating electrode, a porous partition between said fluid and said liquid, a high frequency current source connected to said electrodes and means for passing said fluid through said partition and into close contact with said liquid, between said electrodes.

6. An apparatus for the purpose described, comprising a vessel containing a dielectric liquid, a porous partition dividing said vessel into compartments, an electrode in each of said compartments, one of said compartments containing said liquid, the adjoining compartment containing a gaseous fluid, means for discharging said fluid from said fluid containing compartment into contact with said liquid and means for discharging undamped oscillations of a high frequency current through said fluid and liquid.

7. An apparatus for the purpose described, comprising a vessel containing a dielectric liquid, a porous partition dividing said vessel into compartments, an electrode in each of said compartments, one of said compartments containing said liquid, the adjoining compartment containing a gaseous fluid, means for discharging said fluid through said partition into contact with said liquid, and means for discharging undamped oscillations of a high frequency current through said liquid and said fluid.

8. An apparatus for the purpose described, comprising, a vessel containing a dielectric liquid a porous partition dividing said vessel into compartments, an electrode in each of said compartments, one of said compartments containing said liquid, an adjoining compartment containing a gaseous fluid, means for discharging said fluid through said partition into contact with said liquid, means for discharging undamped oscillations of a high frequency current through said liquid and said fluid and means for continuously withdrawing the product of said combination from said vessel.

9. An apparatus for the purpose described, comprising, in combination, a container having an electrically conductive wall, connected as an electrode in a circuit, a compartment adapted to contain a dielectric liquid in contact with said electrode, a compartment adapted to contain a gaseous fluid, said compartments being separated by a porous partition, having in contact with said fluid, an electrically conductive coating, connected as a cooperating electrode in a high frequency circuit, means for maintaining an electrical field between said electrodes and means for discharging said fluid through said partition into close contact with said liquid within said field.

Signed at New York in the county of New York and State of New York this 19th day of November A. D. 1923.

SAMUEL RUBEN.